(12) United States Patent
Kim et al.

(10) Patent No.: US 8,049,591 B2
(45) Date of Patent: Nov. 1, 2011

(54) TACTILE SENSOR FOR CURVED SURFACE AND MANUFACTURING METHOD THEREOF

(75) Inventors: Jong-Ho Kim, Daejeon (KR); Hyun-joon Kwon, Seoul (KR); Yon-kyu Park, Daejeon (KR); Min-seok Kim, Daejeon (KR); Dae-im Kang, Daejeon (KR); Jae-hyuk Choi, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 412 days.

(21) Appl. No.: 12/310,526

(22) PCT Filed: May 25, 2007

(86) PCT No.: PCT/KR2007/002545
§ 371 (c)(1),
(2), (4) Date: Feb. 27, 2009

(87) PCT Pub. No.: WO2008/026818
PCT Pub. Date: Mar. 6, 2008

(65) Prior Publication Data
US 2010/0176825 A1    Jul. 15, 2010

(30) Foreign Application Priority Data

Aug. 31, 2006 (KR) .......................... 10-2006-0083584
Mar. 19, 2007 (KR) .......................... 10-2007-0026830

(51) Int. Cl.
*H01C 10/10* (2006.01)
(52) U.S. Cl. ..................... 338/47; 338/114; 73/862.046
(58) Field of Classification Search ................... 338/47, 338/114, 210, 333; 73/862.041–862.046; 200/511, 512, 520
See application file for complete search history.

(56) References Cited

U.S. PATENT DOCUMENTS
5,014,224 A * 5/1991 Hans .............................. 338/99
(Continued)

FOREIGN PATENT DOCUMENTS
JP      07-190870 A1   7/1995
KR      100556265 B1   3/2006

OTHER PUBLICATIONS

International Search Report of International Application No. PCT/KR2007/002545 filed on May 25, 2007.

*Primary Examiner* — Kyung Lee
(74) *Attorney, Agent, or Firm* — Kile Park Goekjian Reed & McManus PLLC (57) ABSTRACT

A tactile sensor for curved surfaces applicable to objects with multi-dimensional curvature and a small radius of curvature and a manufacturing method thereof are disclosed. The tactile sensor for curved surfaces includes a lower pattern including a plurality of lower polymer film layers spaced at specified intervals in a lower direction, lower metal layers disposed on the lower polymer film layers, and a number of lower resistors disposed on the lower metal layers, an upper pattern including a plurality of upper polymer film layers spaced at specified intervals in a direction perpendicular to the lower direction, upper metal layers disposed on the upper polymer film layers, and a number of upper resistors disposed below the upper metal layers to be electrically connected to the lower resistors, and a lower polymer layer and an upper polymer layer to bond the lower pattern and the upper pattern to each other.

13 Claims, 10 Drawing Sheets
(2 of 10 Drawing Sheet(s) Filed in Color)

U.S. PATENT DOCUMENTS

| | | | | |
|---|---|---|---|---|
| 5,760,553 | A * | 6/1998 | Astic et al. | 318/244 |
| 6,003,390 | A * | 12/1999 | Cousy | 73/865.7 |
| 6,479,890 | B1 * | 11/2002 | Trieu et al. | 257/678 |
| 6,886,415 | B1 | 5/2005 | Kurogi et al. | |
| 7,112,755 | B2 * | 9/2006 | Kitano et al. | 200/511 |
| 7,311,009 | B2 * | 12/2007 | Kotovsky | 73/777 |

* cited by examiner

Prior Art

TACTILE SENSOR FOR CURVED SURFACE AND MANUFACTURING METHOD THEREOF

BACKGROUND OF THE INVENTION

1. Field of the Invention

The present invention relates to a tactile sensor and a manufacturing method thereof, and more particularly to a tactile sensor for curved surfaces, wherein metal layers and resistors are formed on upper and lower films with excellent bending property and high restoration force, respectively, and the upper and lower films are perpendicularly bonded to each other, thereby increasing flexibility to be applicable to objects with multi-dimensional curvature and a small radius of curvature and a manufacturing method thereof.

2. Description of the Related Art

Recently, a tactile function for obtaining information regarding circumferential environment through touch, for example, a contact force, vibration, surface roughness, heat conductivity versus temperature change and the like has been used for advanced information collection. A biomimetic tactile sensor capable of replacing tactile sensation can be used for microsurgery of blood vessels, various medical diagnoses such as a cancer diagnosis and treatment. Further, the biomimetic tactile sensor can be applied to tactile display technology which is important in virtual environment technology in the future.

Sensors developed as the biomimetic tactile sensor include a force-torque sensor with six degrees of freedom which is used on a wrist of an industrial robot and a sensor used for a gripper of a robot, capable of sensing a contact pressure and instantaneous sliding motion. Such sensors have a relatively large size, thereby having a problem such as low responsiveness.

A possibility of developing the tactile sensor has been verified using technology for manufacturing micro electro mechanical systems (MEMS). However, since the sensor has been developed using a silicon wafer and the like, the sensor does not have flexibility.

Figure 17:
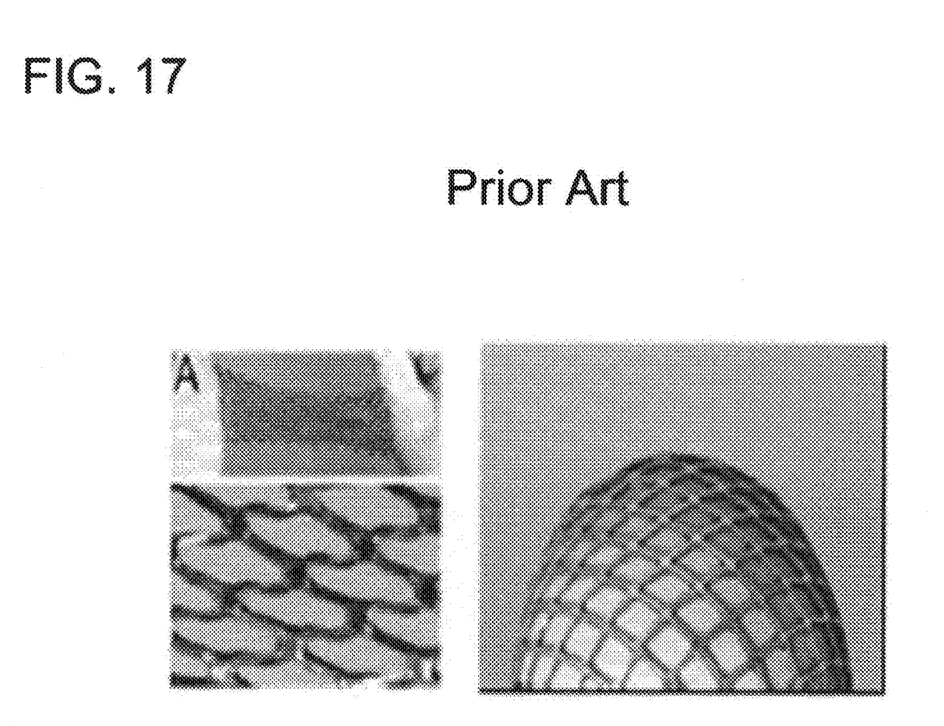
FIG. 17 shows an example of a conventional tactile sensor.

FIG. 17 shows an example of a conventional tactile sensor, which is developed by Takao Someya and colleagues at the University of Tokyo in Japan in 2005.

In this case, the conventional tactile sensor is manufactured by performing a punching process on a single film, thereby realizing flexibility and extensity to some extent.

However, the conventional tactile sensor manufactured through the punching process fails to maximize flexibility because a single film is punched for flexibility. Thus, it is possible to apply the conventional tactile sensor to spherical objects with a large radius of curvature. However, it is hard to apply it to fingers of a humanoid robot or a very small sphere due to a lack of softness like human skin.

SUMMARY OF THE INVENTION

Therefore, the present invention has been made in view of the above problems, and it is an object of the present invention to provide a tactile sensor for curved surfaces, wherein a number of metal layers and resistors are formed on upper and lower polymer films with excellent bending property and high restoration force, respectively, and the upper and lower films are bonded to each other using a flexible polymer material such that signal lines of the polymer films intersect perpendicularly to each other and the resistors are connected to each other at respective intersections, thereby increasing flexibility to be applicable to objects with curvature and a manufacturing method thereof.

Further, it is another object of the present invention to provide a tactile sensor for curved surfaces, wherein a number of signal lines formed in the upper and lower films are formed in a wave-shaped pattern and then the upper and lower films are bonded, thereby increasing extension-compression deformation in the X, Y and diagonal directions, i.e., in all directions to be applicable to objects with a small radius of curvature and a manufacturing method thereof.

In accordance with an aspect of the present invention, there is provided a tactile sensor for curved surfaces comprising: a lower pattern including a plurality of lower polymer film layers spaced at specified intervals in a lower direction, lower metal layers disposed on the lower polymer film layers, and a number of lower resistors disposed on the lower metal layers; an upper pattern including a plurality of upper polymer film layers spaced at specified intervals in a direction perpendicular to the lower direction, upper metal layers disposed on the upper polymer film layers, and a number of upper resistors disposed below the upper metal layers to be electrically connected to the lower resistors; and a lower polymer layer and an upper polymer layer to bond the lower pattern and the upper pattern to each other.

The lower pattern and the upper pattern may be formed into a wave shape.

The lower metal layers and the upper metal layers may be formed of a general metal material. Further, the deposition may be performed through a plating process or using e-beam or a sputtering device.

The lower resistors and the upper resistors may be formed of one selected from a group consisting of pressure sensitive ink, Nichrome (Ni—Cr), carbon black and carbon nano tubes.

In accordance with another aspect of the present invention, there is provided a method of manufacturing a tactile sensor for curved surfaces comprising: depositing a lower metal layer on a lower polymer film layer; etching the lower metal layer and the lower polymer film layer to form a plurality of lower metal layers and lower polymer film layers spaced at specified intervals in a certain direction; forming a number of lower resistors on the lower metal layers spaced at specified intervals to form a lower pattern; depositing an upper metal layer on an upper polymer film layer; etching the upper metal layer and the upper polymer film layer to form a plurality of upper metal layers and upper polymer film layers spaced at specified intervals in a certain direction; forming a number of upper resistors on the upper metal layers spaced at specified intervals to form an upper pattern; and bonding the lower pattern and the upper pattern to each other such that the lower metal layers and the upper metal layers intersect perpendicularly to each other and the lower resistors and the upper resistors are electrically connected to each other at respective intersections.

In accordance with yet another aspect of the present invention, there is provided a method of manufacturing a tactile sensor for curved surfaces comprising: performing a punching process after forming a lower polymer film layer to form a plurality of lower polymer film layers spaced at specified intervals in a certain direction; forming lower metal layers on the lower polymer film layers spaced at specified intervals; forming a number of lower resistors on the lower metal layers to form a lower pattern; performing a punching process after forming an upper polymer film layer to form a plurality of upper polymer film layers spaced at specified intervals in a certain direction; forming upper metal layers on the upper polymer film layers spaced at specified intervals; forming a number of upper resistors on the upper metal layers to form an upper pattern; and bonding the lower pattern and the upper pattern to each other such that the lower metal layers and the upper metal layers intersect perpendicularly to each other and the lower resistors and the upper resistors are electrically connected to each other at respective intersections.

In the method of manufacturing a tactile sensor for curved surfaces, the step of bonding the lower pattern and the upper pattern to each other may include adhering the lower pattern to a lower polymer layer; adhering the upper pattern to an upper polymer layer; and overlapping the lower polymer layer adhered to the lower pattern and the upper polymer layer adhered to the upper pattern such that the lower resistors and the upper resistors are connected to each other to bond the lower pattern and the upper pattern by curing.

Further, in the method of manufacturing a tactile sensor for curved surfaces, the step of bonding the lower pattern and the upper pattern to each other may include overlapping the lower pattern and the upper pattern such that the lower resistors and the upper resistors are connected to each other, loading the overlapped lower pattern and the upper pattern in a mold, and filling a liquid polymer material in the mold to perform bonding by curing.

Further, preferably, the lower pattern and the upper pattern are formed into a wave shape.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The above and other objects, features and other advantages of the present invention will be more clearly understood from the following detailed description taken in conjunction with the accompanying drawings, in which:

FIGS. 10A to 14 show plan views sequentially showing a method of manufacturing a tactile sensor for curved surfaces according to an upper embodiment of the present invention;

DETAILED DESCRIPTION OF THE PREFERRED EMBODIMENTS

Hereinafter, preferred embodiments of the present invention will now be described in detail with reference to the accompanying drawings.

Figure 1:
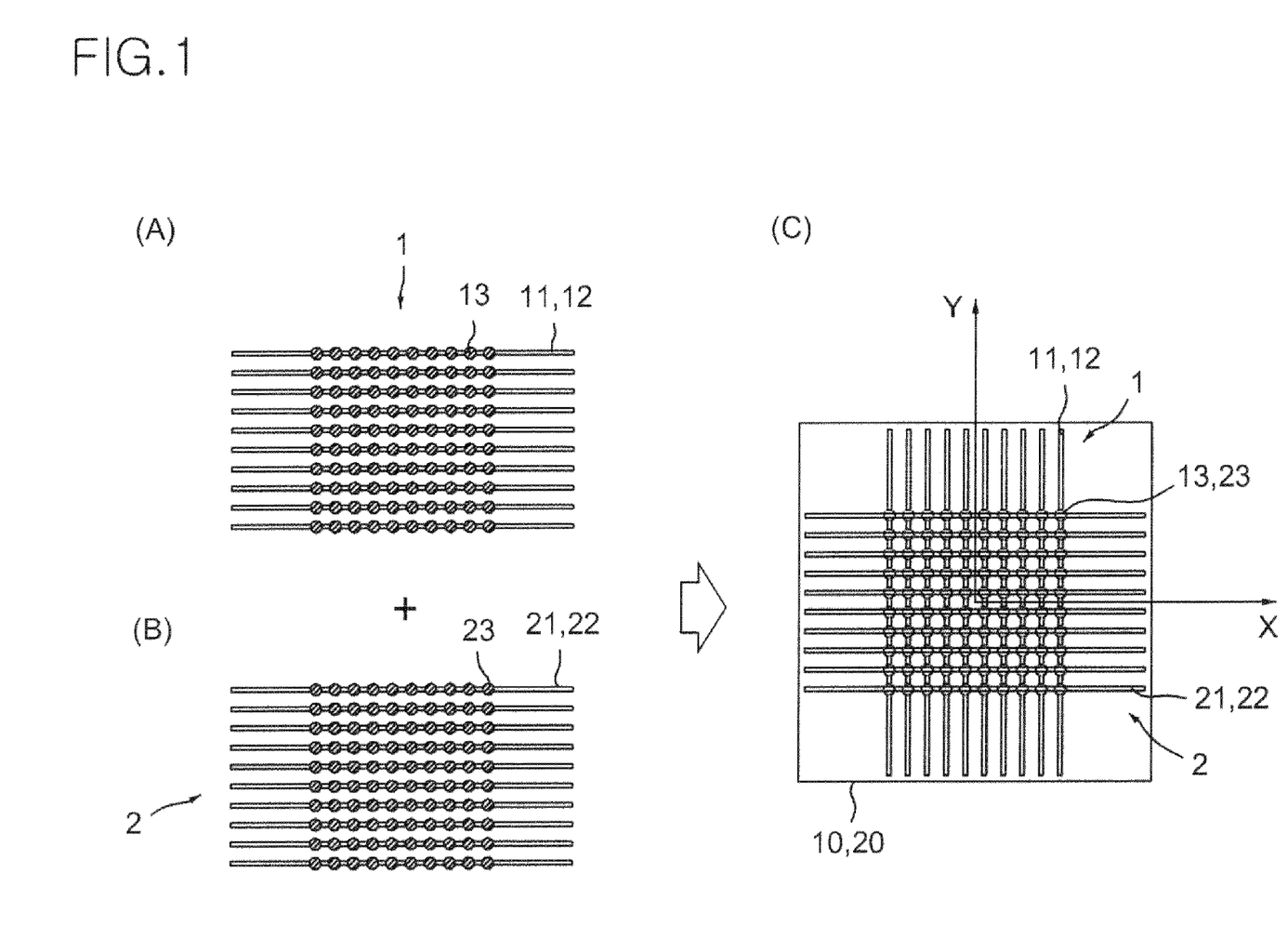
FIGS. 1A, 1B and 1C show plan views of a tactile sensor for curved surfaces according to a lower embodiment of the present invention.
Figure 2:
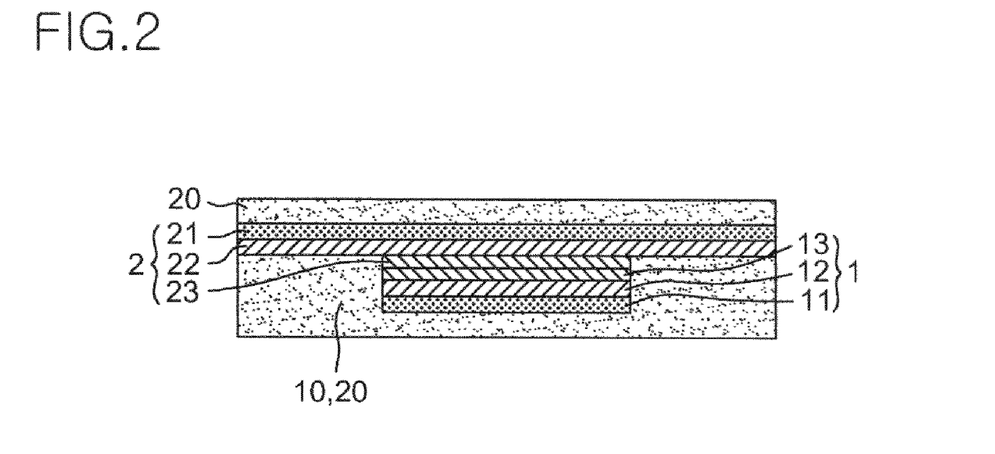
FIG. 2 shows a cross-sectional view of the tactile sensor for curved surfaces that is shown in FIG. 1C.

FIGS. 1A, 1B and 1C show plan views of a tactile sensor for curved surfaces according to a lower embodiment of the present invention. FIG. 2 shows a cross-sectional view of the tactile sensor for curved surfaces that is shown in FIG. 1C.

Referring to FIGS. 1A, 1B and 1C, FIG. 1A shows a plan view of a lower pattern of the tactile sensor. FIG. 1B shows a rear plan view of an upper pattern of the tactile sensor. FIG. 1O shows a plan view of the tactile sensor obtained by combining the lower pattern and the upper pattern. The tactile sensor for curved surfaces according to the embodiment of the present invention includes a lower pattern 1 and an upper pattern 2 having lower polymer film layers 11 and upper polymer film layers 21, respectively.

In this case, the lower polymer film layers 11 and the upper polymer film layers 21 may be formed of flexible polymer films with high restoration force and excellent bending property such as a polyimide film and a polyester film or metal sheets such as a Va—Cu metal sheet.

The lower polymer film layers 11 and the upper polymer film layers 21 are patterned such that the lower polymer film layers 11 or the upper polymer film layers 21 are spaced at specified intervals in a certain direction. The lower polymer film layers and the upper polymer film layers 21 are arranged perpendicularly to each other.

The respective lower polymer film layers 11 spaced at specified intervals are provided with lower metal layers 12. The lower metal layers 12 are provided with a number of lower resistors 13 arranged into a matrix.

Further, the respective upper polymer film layers 21 spaced at specified intervals are provided with upper metal layers 22. The lower metal layers 22 are provided with a number of upper resistors 23 arranged into a matrix.

Further, the lower resistors 13 and the upper resistors 23 may be made of one selected from a group consisting of pressure sensitive ink, Nichrome (Ni—Cr), carbon black and carbon nano tubes. In case of using pressure sensitive ink, the lower and upper resistors 13 and 23 are formed by coating pressure sensitive ink using a screen printing method. In case of using Nichrome, the lower and upper resistors 13 and 23 may be formed by depositing Nichrome using e-beam or a sputtering device and etching the deposited Nichrome.

Although the lower resistors 13 and the upper resistors 23 are shown by circles in the drawing, they may have a rectangular shape.

The lower metal layers 12 are arranged in a first direction and the upper metal layers 22 are arranged in a second direction perpendicular to the first direction such that the lower resistors 13 and the upper resistors 23 are electrically connected to each other at respective intersections.

Further, the lower polymer film layers 11 and the upper polymer film layers 21 have a circular or rectangular shape at portions where the lower pattern is in contact with the upper pattern.

On the other hand, a lower polymer layer and an upper polymer layer may be formed of various polymer materials with high restoration force, excellent bending property and flexibility, for example, PDMS (Polydimethylsiloxane), silicone and polyurethane. Since PDMS is subject to abrasion, it is preferable to use PU with high abrasion resistance and restoration force instead of PDMS.

According to the lower embodiment of the present invention, the metal layers and the resistors are formed on the upper and lower polymer film layers with high flexibility, respectively, and then they are adhered to each other, thereby forming the tactile sensor. Accordingly, the tactile sensor cannot be extended in an X or Y direction, but flexibility of the tactile sensor increases in a diagonal direction so that the tactile sensor can be extended in a diagonal direction.

Thus, the tactile sensor can be applied to spherical objects with multi-dimensional curvature, which have a size smaller than a ping-pong ball, as well as a cylinder with one-dimensional curvature and a sphere with a large radius of curvature. Accordingly, the tactile sensor can be applied to fingers of a humanoid robot or a very small sphere.

Figure 3:
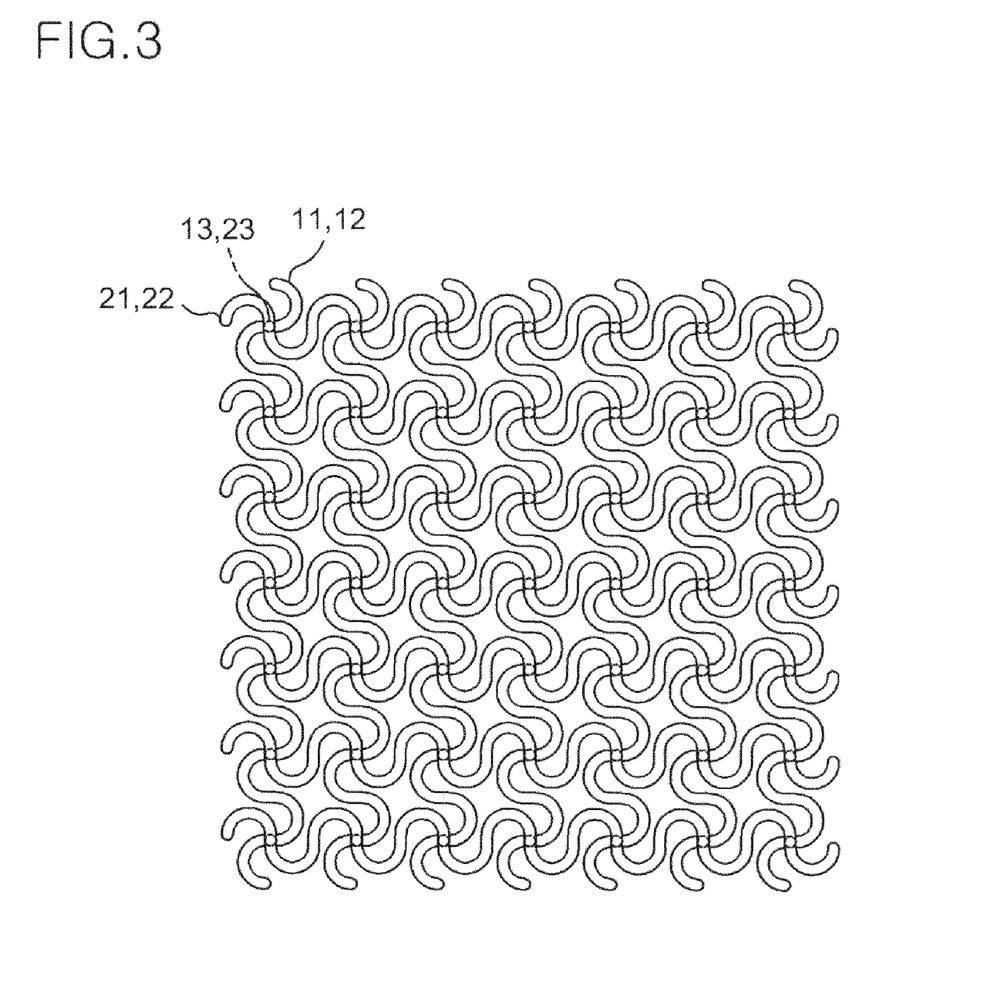
FIG. 3 shows a plan view of the tactile sensor for curved surfaces according to an upper embodiment of the present invention.

FIG. 3 shows a plan view of the tactile sensor for curved surfaces according to an upper embodiment of the present invention. The description of the components having the same functions as those in the lower embodiment is omitted.

Referring to FIG. 3, the lower pattern and the upper pattern are formed into a wave shape, which is a feature of the upper embodiment of the present invention.

The lower pattern and the upper pattern have a wave-shaped pattern in the tactile sensor for curved surfaces according to the upper embodiment of the present invention. Accordingly, flexibility of the tactile sensor increases in the X, Y and diagonal directions, so that the tactile sensor can be extended in all directions.

Thus, it is possible to apply the tactile sensor to objects with multi-dimensional curvature and a very small radius of curvature.

Further, according to the embodiments of the present invention, since the metal layers and the resistors are formed on the polymer film layers with high flexibility, metal peeling in signal lines hardly occurs. Consequently, the tactile sensor has high endurance due to high contact strength between the metal layers and the polymer film layers.

The tactile sensor for curved surfaces using a contact resistance method to which the embodiments of the present invention are applied is well-known in the art. Thus, drawings of the tactile sensor and detailed description of its configuration are omitted.

Hereinafter, there will be described a method of manufacturing the tactile sensor for curved surfaces according to the embodiments of the present invention.

FIGS. 4 to 8 show plan views sequentially showing a method of manufacturing the tactile sensor for curved surfaces according to a lower embodiment of the present invention.

Figure 4:
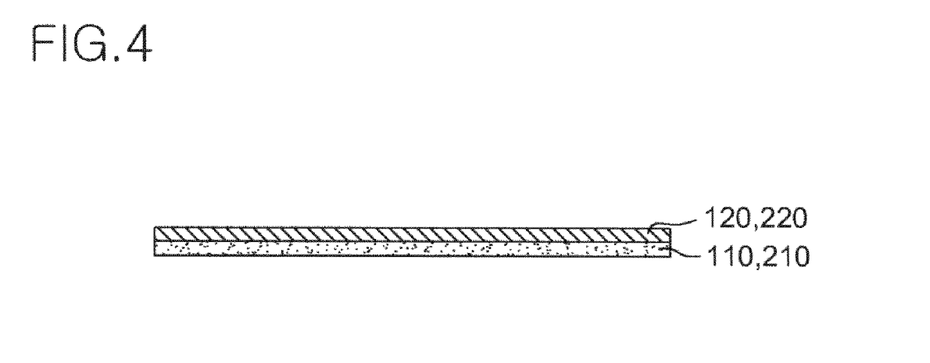
FIGS. 4 to 9 show plan views sequentially showing a method of manufacturing the tactile sensor for curved surfaces according to a lower embodiment of the present invention.
Figure 5:
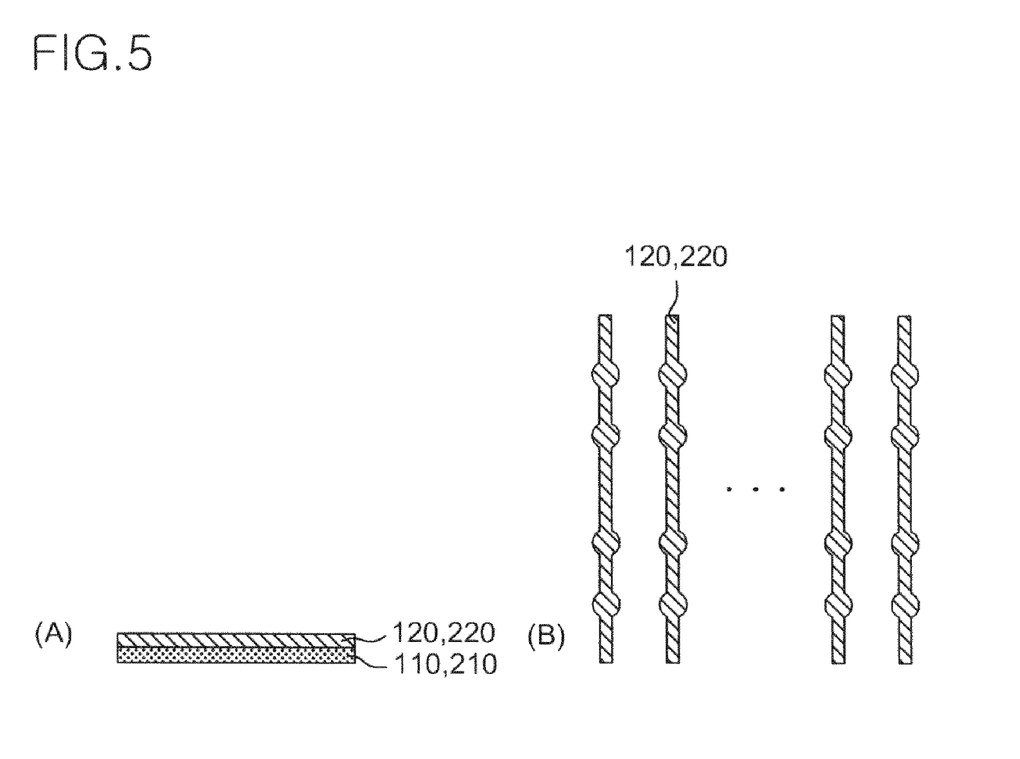
Figure 6:
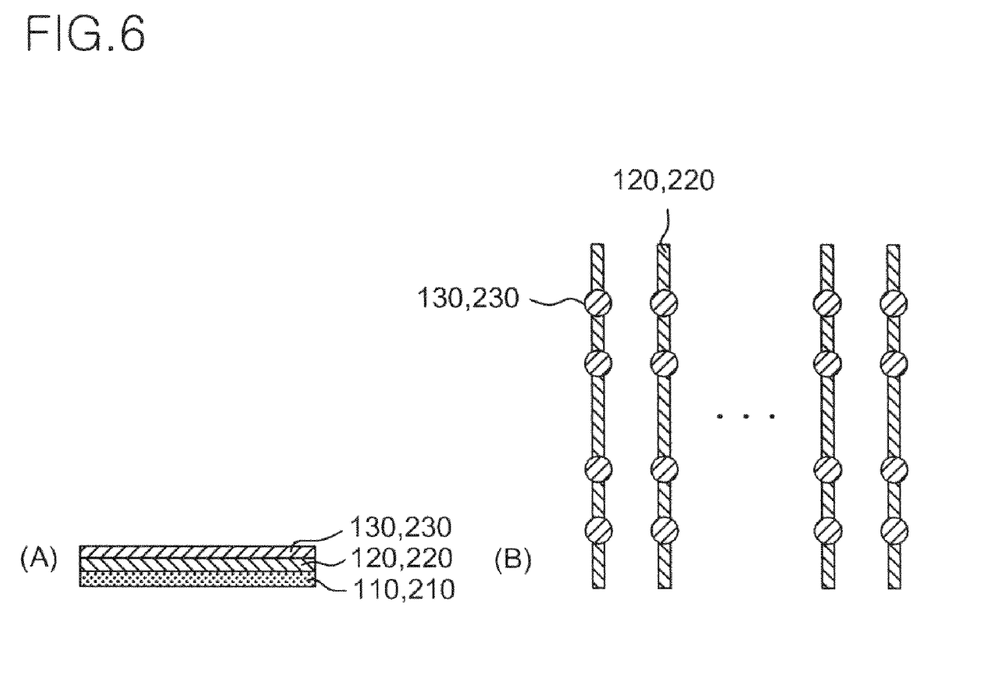

Referring to FIG. 4, a lower polymer film layer 110 and a lower metal layer 120 are formed.

Referring to a cross-sectional view shown in FIG. 5A and a plan view shown in FIG. 5B, the lower metal layer 120 and the lower polymer film layer 110 are patterned and etched to form a plurality of lower metal layers 120 and lower polymer film layers 110 spaced at specified intervals in a certain direction.

In this case, although not shown in the drawing, the lower polymer film layers 110 and the lower metal layers 120 may be patterned into a wave shape.

Referring to FIGS. 6A and 6B, a number of lower resistors 130 are formed on the lower metal layers 120 to form a lower pattern 100. Further, an upper pattern 200, to be described later, including upper polymer film layers 210, upper metal layers 220 and upper resistors 230 is formed through the same process as a process of forming the lower pattern.

The lower resistors 130 and the upper resistors 230 may be made of one selected from a group consisting of pressure sensitive ink, Nichrome (Ni—Cr), carbon black and carbon nano tubes. In case of using pressure sensitive ink, the lower and upper resistors 130 and 230 are formed by coating pressure sensitive ink using a screen printing method. In case of using Nichrome, the lower and upper resistors 130 and 230 may be formed by depositing Nichrome using e-beam or a sputtering device and etching the deposited Nichrome.

Further, the lower polymer film layer 110 and the upper polymer film layer 210 may be formed of flexible polymer films with high restoration force and excellent bending property such as a polyimide film and a polyester film or metal sheets such as a Va—Cu metal sheet.

Figure 7:
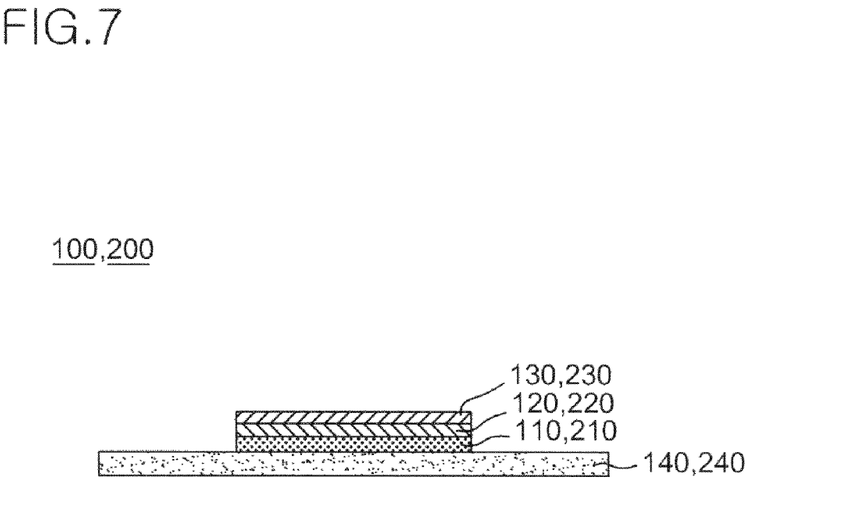

Referring to FIG. 7, the lower pattern 100 and the upper pattern 200 are adhered to a lower polymer layer 140 and an upper polymer layer 240, respectively.

Figure 8:
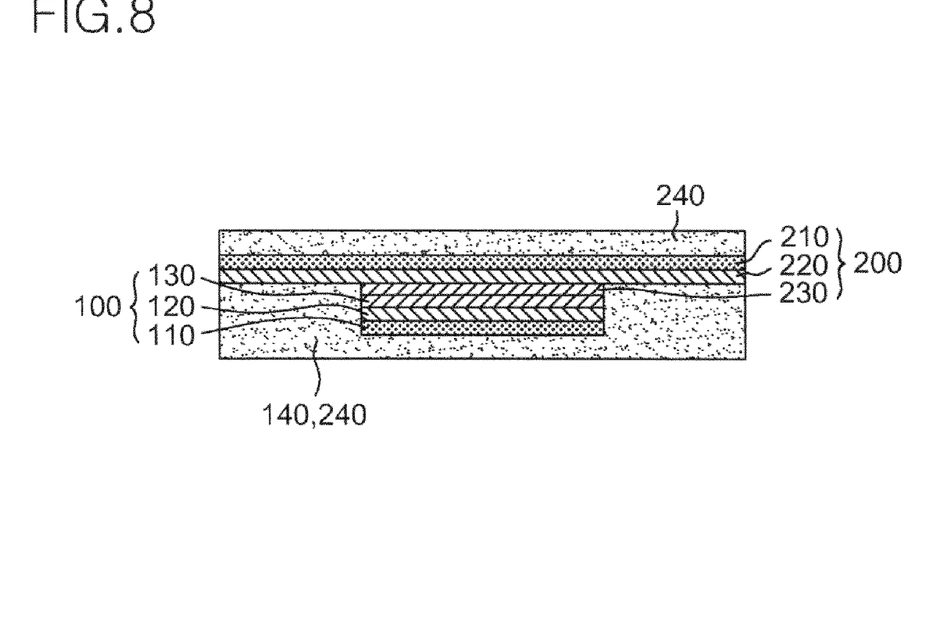

Referring to FIG. 8, the lower pattern 100 and the upper pattern 200 are overlapped with each other such that the lower metal layers 120 and the upper metal layers 220 cross each other. The lower pattern 100 and the upper pattern 200 are bonded by curing such that the upper resistors 230 of the upper pattern 200 and the lower resistors 130 of the lower pattern 100 are electrically connected to each other at respective intersections.

Figure 9:
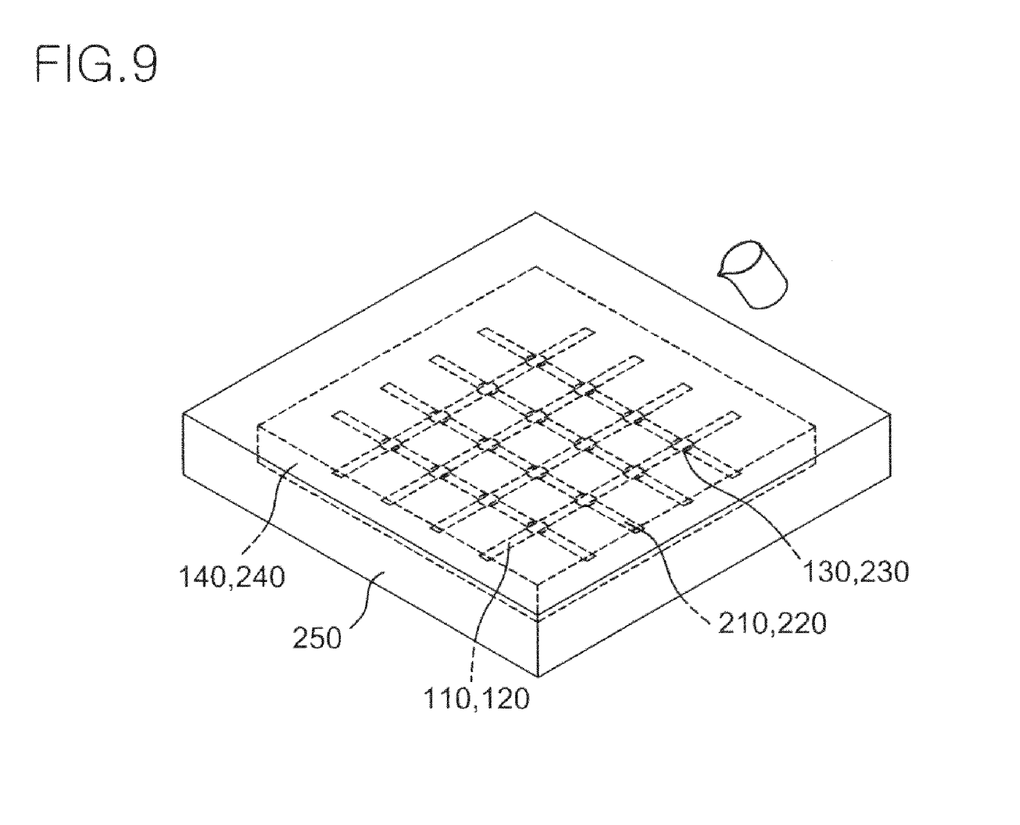
Figure 10:
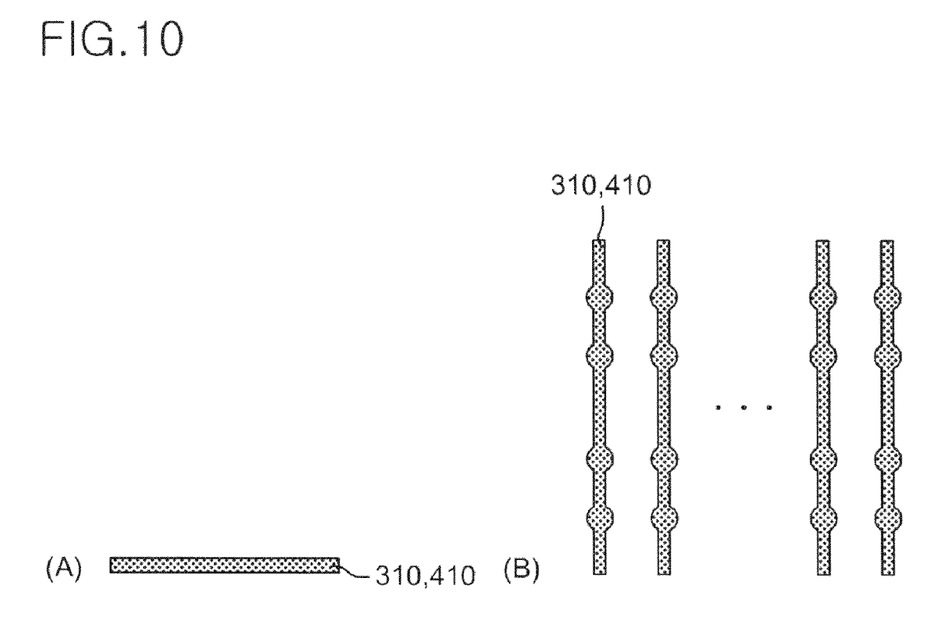
Figure 11:
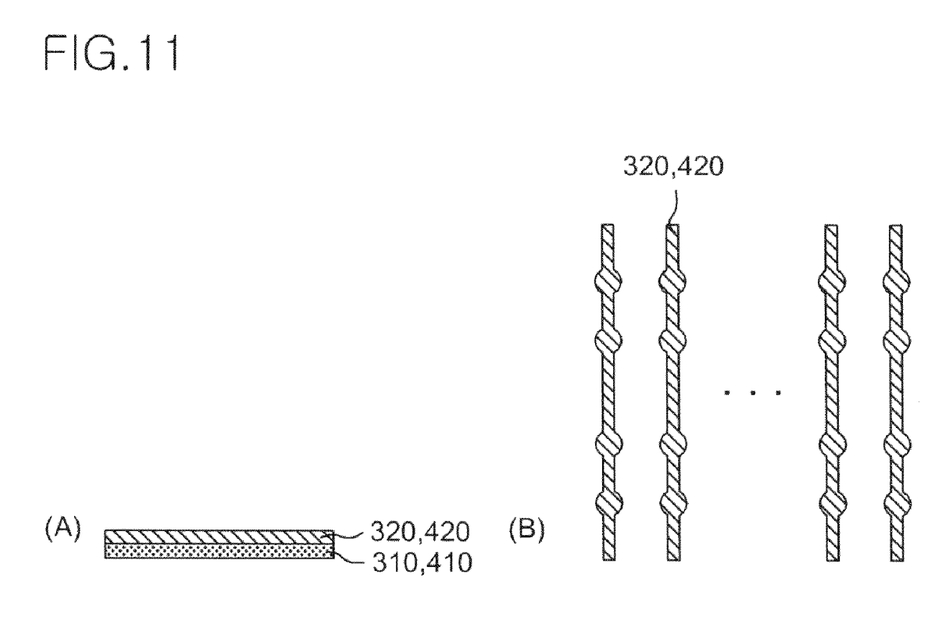
Figure 12:
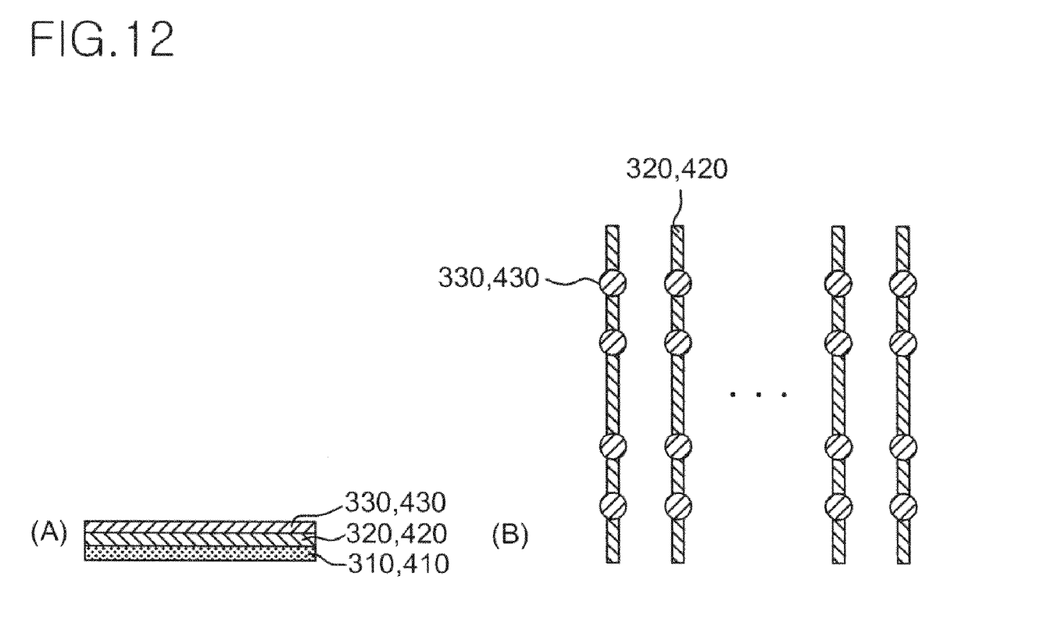

In another way, as shown in FIG. 9, the lower pattern 100 and the upper pattern 200 are overlapped with each other such that the lower metal layers 120 and the upper metal layers 220 cross each other and the upper resistors 230 and the lower resistors 130 are electrically connected to each other. Then, the lower pattern 100 and the upper pattern 200 are loaded in a mold 250. A liquid polymer material is filled in the mold 250 and bonding is performed by curing. In this case, cured polymer material layers 140 and 240 are formed to cover the lower pattern 100 and the upper pattern 200, thereby performing an insulating function while fixing the lower pattern 100 and the upper pattern 200.

The lower polymer layer 140 and the upper polymer layer 240 may be formed of various polymer materials with excellent restoration force and high flexibility, for example, PDMS, silicon and polyurethane. Since PDMS is subject to abrasion, it is preferable to use PU with high abrasion resistance and restoration force instead of PDMS.

FIGS. 10A to 14 show plan views sequentially showing a method of manufacturing a tactile sensor for curved surfaces according to an upper embodiment of the present invention.

Referring to a cross-sectional view shown in FIG. 10A and a plan view shown in FIG. 10B, a punching process is performed such that lower polymer film layers 310 are spaced at specified intervals in a certain direction.

Referring to a cross-sectional view shown in FIG. 11A and a plan view shown in FIG. 11B, lower metal layers 320 are deposited on the lower polymer film layers 310 spaced at specified intervals.

Referring to a cross-sectional view shown in FIG. 12A and a plan view shown in FIG. 12B, a number of lower resistors 330 are formed on the lower metal layer 320 to form a lower pattern 300. Further, an upper pattern 400, to be described later, including upper polymer film layers 410, upper metal layers 420 and upper resistors 430 is formed through the same process as a process of forming the lower pattern 300.

Figure 13:
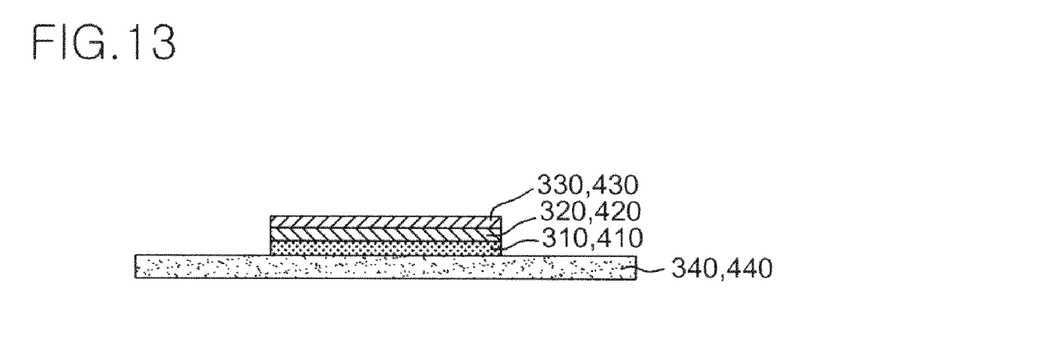

Referring to FIG. 13, the lower pattern 300 and the upper pattern 400 are adhered to a lower polymer layer 340 and an upper polymer layer 440, respectively.

Figure 14:
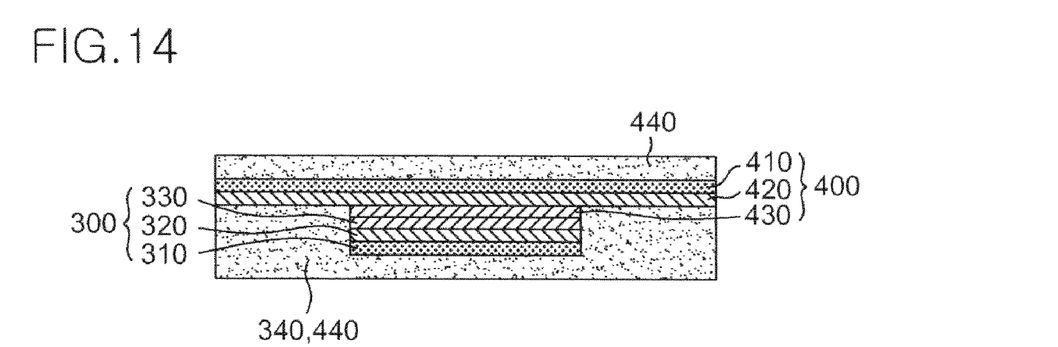

Referring to FIG. 14, the lower pattern 300 and the upper pattern 400 are overlapped with each other such that the lower metal layers 320 and the upper metal layers 420 cross each other. The lower pattern 300 and the upper pattern 400 are bonded by curing such that the upper resistors 430 and the lower resistors 330 are electrically connected to each other at respective intersections.

Further, although not shown in the drawings, the lower pattern 300 and the upper pattern 400 may be bonded as shown in FIG. 9. That is, the lower pattern 300 and the upper pattern 400 are overlapped with each other and loaded in a mold. Then, a liquid polymer material is filled in the mold and bonding is performed by curing.

Figure 15:
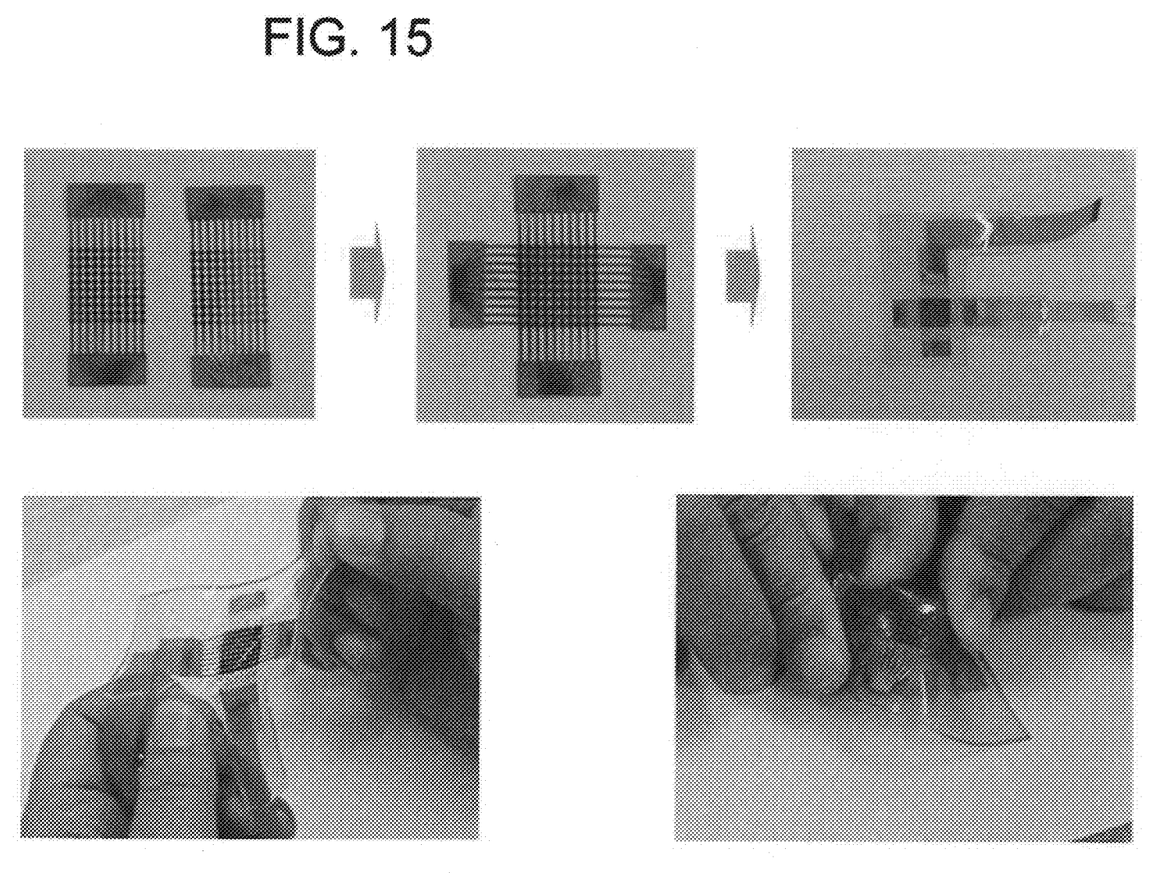
FIG. 15 is a photograph showing a process of manufacturing the tactile sensor with flexibility according to the present invention.

FIG. 15 is a photograph showing a process of manufacturing the tactile sensor with flexibility according to the present invention.

Referring to FIG. 15, according to the embodiments of the present invention, the lower pattern and upper pattern respectively including metal layers formed on the polymer layers with excellent flexibility are bonded to each other such that signal lines formed on the lower pattern and upper pattern intersect perpendicularly to each other.

The tactile sensor manufactured as described above has excellent flexibility and the detachment of signal lines formed of metal hardly occurs. Accordingly, it is possible to apply the tactile sensor to a spherical object with a small radius of curvature as shown in the photograph of FIG. 15.

Figure 16:
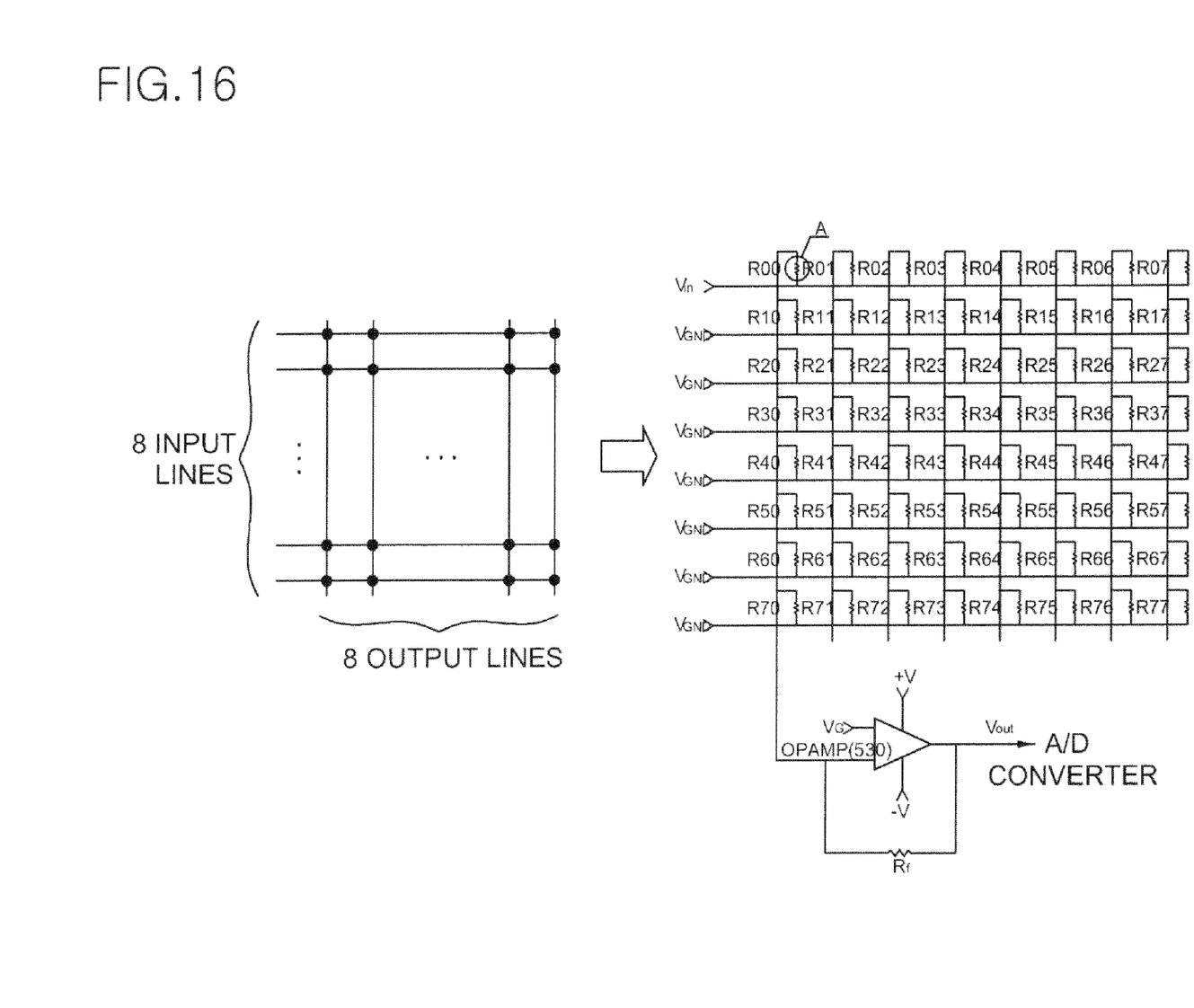
FIG. 16 is a circuit diagram showing signal processing of the tactile sensor according to the present invention.

Referring to FIG. 16, 8 lower patterns and 8 upper patterns are formed in an 8×8 matrix. FIG. 16 shows contact resistances between the lower resistors and the upper resistors according to an external force and a signal gain circuit diagram according to the contact resistances.

An output from an output terminal is applied to a negative input terminal of an analog amplifier (OPAMP) 530. A voltage of the same level as voltages applied to input lines except a main input line connected to a resistor A that is a measurement target is applied to a positive input terminal of the analog amplifier 530.

In other words, a voltage $V_G$ is applied to the positive input terminal of the analog amplifier 530. A voltage $V_{in}$ is applied to a main input line connected to a resistor A that is a measurement target, and voltages $V_{GND}$ are applied to input lines except the main input line. The voltages $V_{GND}$ and $V_G$ are equal.

Preferably, a resistance $R_f$ of a feedback resistor connected between the output terminal and the negative input terminal of an analog amplifier 530 is set to be equal to a resistance of a resistor included in a force sensor.

An output value $V_{out}$ of the analog amplifier (OPAMP) corresponding to a resistance $R_{00}$ of the resistor A in FIG. 16 is represented by the following equation (1).

$$V_{out} = -\frac{R_f}{R_{00}} V_{in} \quad (1)$$

As described above, in the tactile sensor according to the present invention, a number of signal lines and resistors are formed in polymer layers of upper and lower patterns with high restoration force and excellent bending property, respectively. The upper and lower patterns are bonded such that signal lines of the upper and lower patterns intersect perpendicularly to each other, whereby the resistors of the upper pattern are in contact with the resistors of the lower pattern at respective intersections. Accordingly, the signal lines and resistors are formed between films with excellent flexibility, whereby it is possible to apply the tactile sensor to objects with curvature.

Further, in the tactile sensor according to the present invention, a number of signal lines formed in the upper and lower patterns are formed in a wave-shaped pattern and then the upper and lower patterns are bonded by using a polymer material. Accordingly, extensity of the tactile sensor increases in the X, Y and diagonal directions, i.e., in all directions. Thus, it is possible to apply the tactile sensor to objects with a small radius of curvature, for example, fingers of a humanoid robot or a very small sphere.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A tactile sensor for curved surfaces comprising:
a lower pattern including a plurality of lower polymer film layers spaced at specified intervals in a lower direction, lower metal layers disposed on the lower polymer film layers, and a number of lower resistors disposed on the lower metal layers;
an upper pattern including a plurality of upper polymer film layers spaced at specified intervals in a direction perpendicular to the lower direction, upper metal layers disposed on the upper polymer film layers, and a number of upper resistors disposed below the upper metal layers to be electrically connected to the lower resistors; and
a lower polymer layer and an upper polymer layer to bond the lower pattern and the upper pattern to each other such that the lower resistors and the upper resistors are electrically connected to each other at respective intersections.

2. The tactile sensor according to claim 1, wherein the lower polymer film layers and the upper polymer film layers are patterned into a wave shape.

3. The tactile sensor according to claim 1, wherein the lower polymer film layers and the upper polymer film layers are formed of one selected from a group consisting of a polyimide film, a polyester film and a Va—Cu metal sheet.

4. The tactile sensor according to claim 1, wherein the lower resistors and the upper resistors are formed of one selected from a group consisting of pressure sensitive ink, Nichrome (Ni—Cr), carbon black and carbon nano tubes.

5. The tactile sensor according to claim 1, wherein the lower polymer film layers and the upper polymer film layers have a circular or rectangular shape at portions where the lower pattern is in contact with the upper pattern.

6. A method of manufacturing a tactile sensor comprising:
depositing a lower metal layer on a lower polymer film layer;
etching the lower metal layer and the lower polymer film layer to form a plurality of lower metal layers and lower polymer film layers spaced at specified intervals in a certain direction;
forming a number of lower resistors on the lower metal layers spaced at specified intervals to form a lower pattern;
depositing an upper metal layer on an upper polymer film layer;
etching the upper metal layer and the upper polymer film layer to form a plurality of upper metal layers and upper polymer film layers spaced at specified intervals in a certain direction;
forming a number of upper resistors on the upper metal layers spaced at specified intervals to form an upper pattern; and
bonding the lower pattern and the upper pattern to each other such that the lower metal layers and the upper metal layers intersect perpendicularly to each other and the lower resistors and the upper resistors are electrically connected to each other at respective intersections.

7. A method of manufacturing a tactile sensor comprising:
performing a punching process after forming a lower polymer film layer to form a plurality of lower polymer film layers spaced at specified intervals in a certain direction;

forming lower metal layers on the lower polymer film layers spaced at specified intervals;

forming a number of lower resistors on the lower metal layers to form a lower pattern;

performing a punching process after forming an upper polymer film layer to form a plurality of upper polymer film layers spaced at specified intervals in a certain direction;

forming upper metal layers on the upper polymer film layers spaced at specified intervals;

forming a number of upper resistors on the upper metal layers to form an upper pattern; and bonding the lower pattern and the upper pattern to each other such that the lower metal layers and the upper metal layers intersect perpendicularly to each other and the lower resistors and the upper resistors are electrically connected to each other at respective intersections.

8. The method according to claim 6, wherein the step of bonding the lower pattern and the upper pattern to each other includes:

adhering the lower pattern to a lower polymer layer;

adhering the upper pattern to an upper polymer layer; and overlapping the lower polymer layer adhered to the lower pattern and the upper polymer layer adhered to the upper pattern such that the lower resistors and the upper resistors are connected to each other to bond the lower pattern and the upper pattern by curing.

9. The method according to claim 6, wherein the step of bonding the lower pattern and the upper pattern to each other includes:

overlapping the lower pattern and the upper pattern such that the lower resistors and the upper resistors are connected to each other, loading the overlapped lower pattern and the upper pattern in a mold, and filling a liquid polymer material in the mold to perform bonding by curing.

10. The method according to claim 6, wherein the lower polymer layer and the upper polymer layer are formed of one selected from a group consisting of PDMS, silicone and polyurethane.

11. The method according to claim 7, wherein the step of bonding the lower pattern and the upper pattern to each other includes:

adhering the lower pattern to a lower polymer layer;

adhering the upper pattern to an upper polymer layer; and overlapping the lower polymer layer adhered to the lower pattern and the upper polymer layer adhered to the upper pattern such that the lower resistors and the upper resistors are connected to each other to bond the lower pattern and the upper pattern by curing.

12. The method according to claim 7, wherein the step of bonding the lower pattern and the upper pattern to each other includes:

overlapping the lower pattern and the upper pattern such that the lower resistors and the upper resistors are connected to each other, loading the overlapped lower pattern and the upper pattern in a mold, and filling a liquid polymer material in the mold to perform bonding by curing.

13. The method according to claim 7, wherein the lower polymer layer and the upper polymer layer are formed of one selected from a group consisting of PDMS, silicone and polyurethane.

* * * * *